No. 676,662. Patented June 18, 1901.
J. PATTEN.
FREEZING APPARATUS.
(Application filed Aug. 29, 1896.)
(No Model.) 3 Sheets—Sheet 1.

Witnesses:

Inventor:
John Patten
By his Attorney,
Benjamin Price

No. 676,662. Patented June 18, 1901.
J. PATTEN.
FREEZING APPARATUS.
(Application filed Aug. 29, 1896.)
(No Model.) 3 Sheets—Sheet 2.
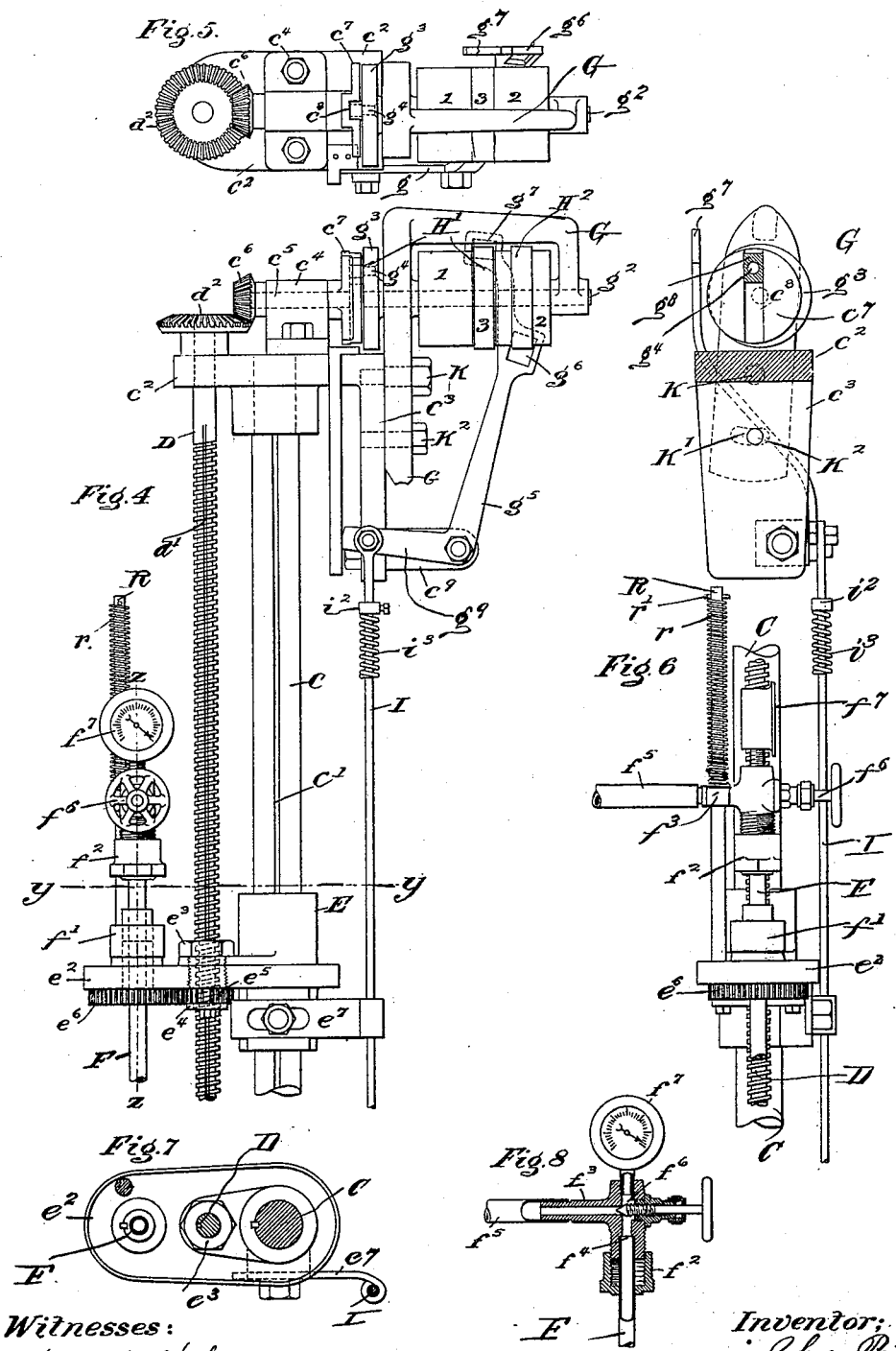
Witnesses:
Harry N. Hahn
H. MacCarthy
Inventor:
John Patten
By his Attorney,
Benjamin Price No. 676,662. Patented June 18, 1901.
J. PATTEN.
FREEZING APPARATUS.
(Application filed Aug. 29, 1896.)
(No Model.) 3 Sheets—Sheet 3.
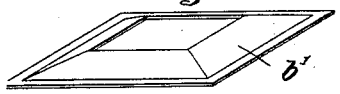
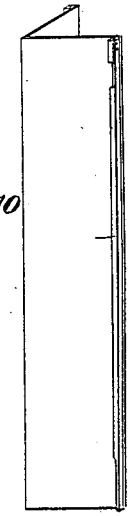
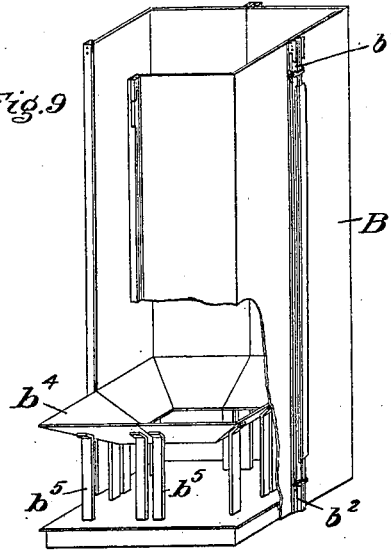
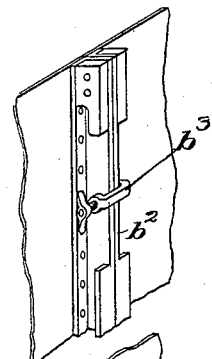
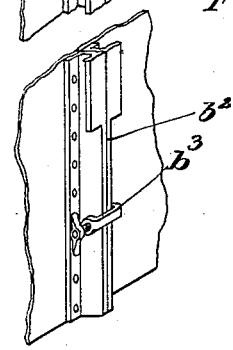
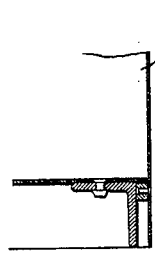
Witnesses:
Harry W. Hahn
H. MacCarthy
Inventor:
John Patten
By his Attorney.
Benjamin Price
THE NORRIS PETERS CO., PHOTO-LITHO., WASHINGTON, D. C.

UNITED STATES PATENT OFFICE.

JOHN PATTEN, OF BALTIMORE, MARYLAND, ASSIGNOR, BY MESNE ASSIGNMENTS, TO THE PATTEN VACUUM ICE MACHINE COMPANY, OF SAME PLACE.

FREEZING APPARATUS.

SPECIFICATION forming part of Letters Patent No. 676,662, dated June 18, 1901.

Application filed August 29, 1896. Serial No. 604,271. (No model.)

*To all whom it may concern:*

Be it known that I, JOHN PATTEN, a citizen of the United States, and a resident of the city of Baltimore, State of Maryland, have invented certain new and useful Improvements in Freezing Apparatus, of which the following is a specification.

This invention relates to apparatus of that class in which water is frozen by subjecting it to the influence of a high vacuum. The rapid evaporation thus produced deprives the water of its heat and converts it into ice.

The present invention relates particularly to the vessel or chamber in which the water is frozen, the means for introducing and distributing the water to be frozen evenly within said vessel to produce ice of uniform thickness, and mechanism for facilitating the removal of the ice.

The invention will be described in connection with the accompanying drawings, in which—

Figure 1:
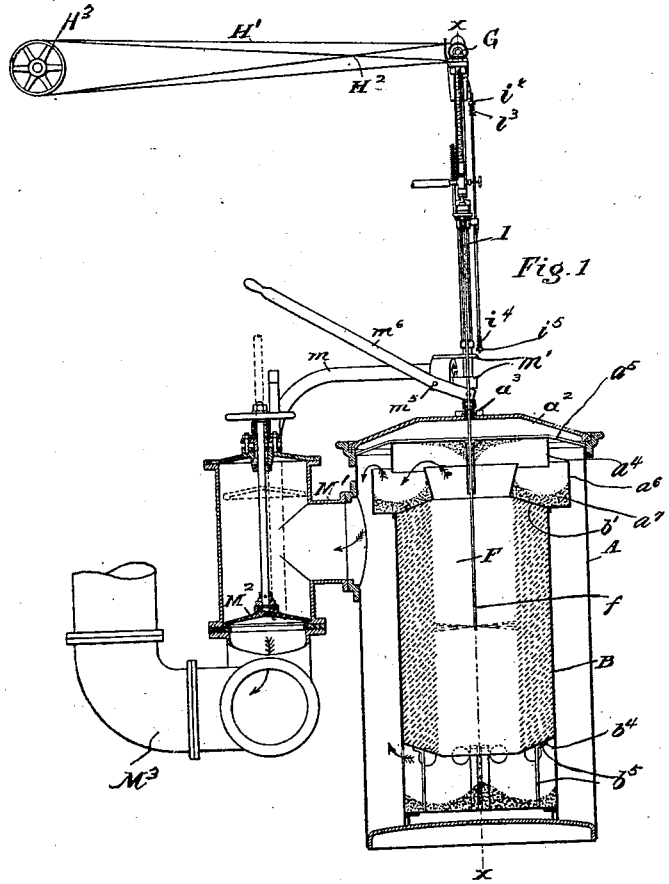
Figure 2:
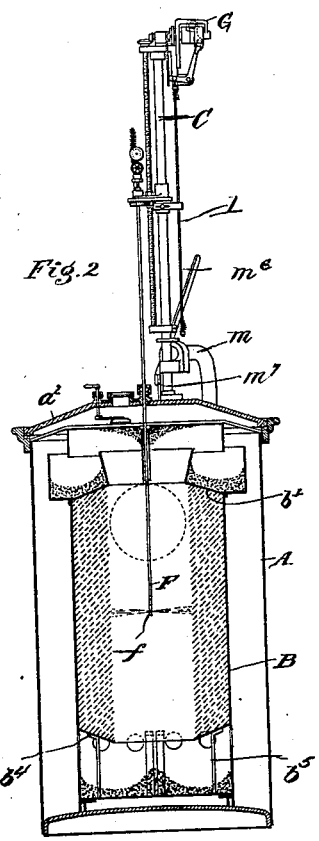
Figure 3:
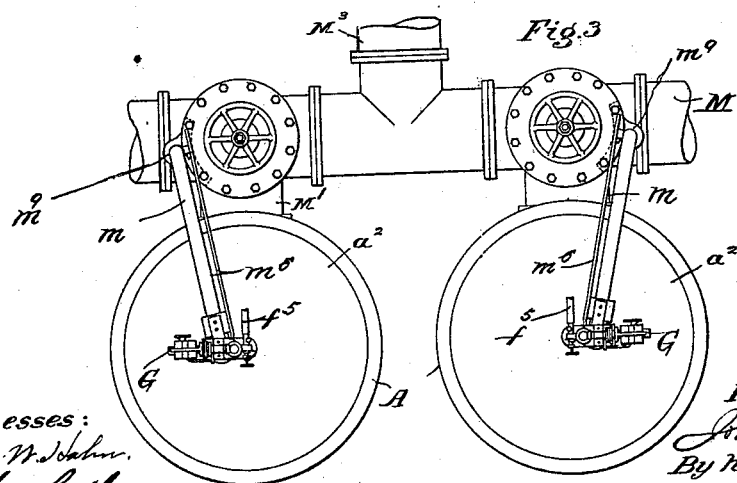

Figure 1 is a side elevation, partly in section, through one of the freezing-chambers. Fig. 2 is a section on the line X X of Fig. 1. Fig. 3 is a plan view of two of the freezing-chambers and a portion of the vapor-pipe to which they are connected. Fig. 4 is a detail view of parts of the apparatus located above the freezing-chamber. Fig. 5 is a plan view of parts shown in Fig. 4. Fig. 6 is a detail view of certain parts shown in Fig. 4, partly in section, as viewed from the left of said figure. Fig. 7 is a plan view of parts shown in Fig. 4 looking downward from the line Y Y. Fig. 8 is a section taken on the line Z Z, Fig. 4. Fig. 9 is a perspective view of the inner removable wall upon which the ice is formed. Fig. 10 is a similar view of one of the sections of the wall. Fig. 11 shows a cover or top plate for the inner wall. Fig. 12 illustrates details of the devices for assembling and disconnecting the sections of the wall, and Fig. 13 shows a means by which the inner removable wall may be attached to a bottom plate.

Referring to Figs. 1 and 2, A indicates one of the freezing-chambers, and B an inner removable wall on which the water is sprayed and ice formed. The chamber A may be of any desired form adapted to withstand the atmospheric pressure when the air is exhausted from the interior. It is provided with a removable cover $a^2$, having a stuffing-box $a^3$, through which the spray-pipe F passes.

The inner wall B is preferably polygonal in outline in order that the ice formed thereon may have flat faces. As shown in the drawings, it is rectangular in plan or section. As illustrated in Figs. 9 to 13, inclusive, the inner removable wall comprises four sections, each section consisting of a right-angled plate which comprises two halves of adjacent sides of a rectangular box. These plates $b$ are provided at their vertical edges with flanges $b^2$, which register and are adapted to be clamped together by suitable clamps $b^3$. By loosening the clamps the sections $b$ may be separated and removed from the ice. A cover $b'$, Fig. 11, is preferably applied to the box during the formation of the ice to shape the upper end of the block. The lower end of the block is formed on a base-plate $b^4$, which is supported upon the floor by the columns $b^5$. The cover $b'$ has a central opening through which vapor passes during the process of freezing, as indicated by the arrows in Fig. 1, and the base-plate $b^4$ has a central opening through which any loose ice or snow which may be formed in the chamber may fall.

On the cover $a^2$ is fixed a vertical column or post C, which supports the spraying mechanism. The post C slides vertically in guides $m'$ in the free end of a horizontal arm of a crane $m$. As shown, this crane is mounted to rotate upon a vertical axis in a bearing $m^9$, supported on the vapor-pipe M. Pivoted at $m^5$ on the crane is a lever $m^6$, the forward end of which is connected by a link $m^7$ with the cover $a^2$. It will be seen that by bearing down upon the rear end or handle of the lever $m^6$ the cover $a^2$ and the post C and other parts supported by said cover will be raised. In this manner the cover and all the apparatus connected thereto may be lifted and moved to one side to permit the ice to be removed from the freezing-chamber A.

In the manufacture of ice by the present apparatus the water to be frozen is sprayed upon a wall or surface, the spray being at the same time exposed to the action of a high vacuum. A small portion of the water is vaporized, the vapor passing off through the vapor-pipe to suitable vacuum-creating apparatus. This vapor carries off the heat from the remaining water, cooling it to such an extent that if the supply be properly regulated it will freeze immediately on contact with the surface at which it is directed or the ice previously formed on said surface. I have found it practicable to build up ice by this method on any wall within a vacuum-chamber, either horizontal, inclined, or vertical. I have found it preferable, however, to form the ice upon a vertical wall, such as shown in the drawings, or a wall sufficiently inclined to cause water to drain from it rapidly. In the normal operation of the machine—that is, when the vacuum is sufficiently high and the water is introduced at the proper rate—the water freezes, as above described, immediately upon impact with the surface against which it is directed. It sometimes happens, however, that the vacuum may be momentarily impaired or the supply of water may be temporarily too great, and in such case if the ice were being formed on the bottom of the chamber water would accumulate thereon and upon resuming normal conditions the layer of water would freeze into ice having large blow-holes and so porous as to be of little market value; but by forming the ice upon a vertical or self-draining wall any surplus water will immediately run off and compact ice, free from water and visible cavities, will be invariably formed. In this connection it may be stated that the ice may be formed equally well upon the permanent wall of the freezing-chamber or upon an inner removable wall, such as herein described. In the former case the ice may be detached by temporarily warming the surface upon which it is formed, and in the latter case the removable wall, with the ice attached, may be bodily lifted from the freezing-chamber. In some cases this latter arrangement is preferable.

The present invention includes means for spraying water in approximately uniform quantities over the surface upon which the ice is to be formed, such means, as illustrated in the present case, comprising a spray-pipe which is reciprocated and simultaneously rotated, thereby spraying the water successively over different portions of the ice surface. I believe myself to be the first to form ice by spraying water upon a surface *in vacuo* in such quantities or at such a rate that it will freeze substantially at the point of impact with the surface; also, the first to distribute water to be frozen *in vacuo* upon a surface by means of a moving spray-pipe, and also to form ice in a vacuum upon a self-draining surface. By these means I have been successful in forming compact hard ice by the vacuum process. The means for introducing the water into the freezing-chamber and continuously moving the spray-pipe will now be described.

The spray-pipe F is provided with one or more openings $f$, arranged to direct the water against the wall or box B. Rigidly attached to the spray-pipe is a clutch member $f'$, which supports the pipe and engages the hub of a gear $e^6$, through which the pipe passes. By means of the gear and clutch the pipe is rotated. The upper end of the pipe enters and is free to rotate in a socket $f^4$ in one branch of a T-shaped fitting. A stuffing-box $f^2$ is provided to render the joint between the pipe and the fitting water-tight. To a second branch $f^3$ of the fitting is connected a flexible water-supply pipe $f^5$, and a third branch communicates with the pressure-gage $f^7$. The gage $f^7$ will indicate the pressure of the water entering the pipe F, and this pressure may be controlled by means of a valve, such as that indicated at $f^6$, Fig. 8.

Upon the post or column C slides a hub E, said hub having a spline engaging a longitudinal groove $c'$ in the column, whereby it is prevented from turning. Upon the hub E is supported a horizontal plate $e^2$, in the forward end of which is swiveled the gear $e^6$ for supporting and reciprocating the pipe F. On the upper side of the plate $e^2$ is a fixed nut $e^3$, through which passes a vertical screw-shaft D. In the plate $e^2$ is swiveled a pinion $e^5$, through which the shaft D passes. The pinion is free to slide upon the shaft, but must turn with it by reason of a spline engaging the longitudinal groove $d'$ in said shaft.

Upon the plate $e^2$ is supported a vertical post R, which passes through an eye on the connection $f^8$ of the feed-pipe. Between this eye and the upper end of the post is a coiled spring $r$, which is compressed between the pin $r'$ and the fitting $f^3$. The spring $r$, it will be seen, constantly presses downward upon the fitting $f^3$, which pressure holds the fitting in position upon the upper end of the spray-pipe F and prevents the parts from separating.

Upon the upper end of post C is supported a horizontal plate $c^2$, having a vertical depending arm $c^3$. The upper end of screw-shaft D has a bearing in the forward end of plate $c^2$ and is supported therein by bevel-gear $d^2$, fixed on the end of said shaft. In the bearing $c^4$, supported on plate $c^2$, is a short shaft $c^5$, having on its forward end a bevel-gear $c^6$, meshing with the gear $d^2$, and upon its rear end a disk $c^7$, with a diametrical groove in its face.

Upon the rear face of the arm $c^3$ is a fixed bolt or pin K, upon which is pivoted a hanger G. In bearings in the hanger G is a shaft $g^2$, having on its forward end a disk $g^3$, adjacent to disk $c^7$. The disk $g^3$ carries a crank-pin $g^4$, upon which is pivoted a block $g^8$, which slides in groove $c^8$ in the disk $c^7$. Upon the shaft $g^2$ are two loose pulleys 1 and 2 and a fixed pulley 3, which pulleys are turned in a manner to be hereinafter described by straight and crossed belts H' H², driven by pulley H³. These belts pass, respectively, through openings $g^6$ $g^7$ in a belt-shifting lever $g^5$, which is pivotally mounted on a bracket $c^9$, supported on the lower end of arm $c^3$. An arm $g^9$ of lever $g^5$ is pivotally connected to a shifting rod I, which passes through an arm $e^7$ on the hub E. Rod I is provided with upper and lower collars $i^2$ $i^5$, and interposed between these collars and the bracket $e^7$ are springs $i^3$ $i^4$, Figs. 1, 2, and 4. The hanger G is adjustable about the pivot K to vary the relative positions of the shafts $g^2$ and $c^5$, the bracket being held in any desired position by means of the bolt K², passing through slot K'.

It is preferable to connect a series of freezing-chambers to a single exhaust apparatus and provide means for temporarily cutting off communication between any freezing-chamber and the exhaust for the purpose of removing the ice. In this manner the vacuum-producing means may be operated continuously, the ice being formed in some of the chambers while it is being removed from one or more of the others. As shown, the vapor passes out of the freezing-chambers through branch pipes M', which connect them with a common vapor-tube M, said tube being connected with the vacuum-producing apparatus by a pipe M³. In the branches M' are valves M², suitable for cutting off communication between the vapor-pipe M and the freezing-chambers. In the upper portion of each freezing-chamber I preferably arrange a series of baffle-plates to separate out from the vapor any snow or ice particles which may form in the freezing-chamber. As shown, the baffle-plate $a^4$, depending from a disk $a^5$, is arranged between two baffle-plates $a^6$ $a^7$, supported on the cover $b'$ of the box B. The course of the vapor through the baffle-plates and the vapor-pipe is shown by the arrows in Fig. 1.

The apparatus is designed to operate as follows: The freezing-chamber being closed, as shown in Figs. 1 and 2, and the valve M² opened, as shown in dotted lines in Fig. 1, the belts H' H² are started and the water turned on through the pipes $f^5$ F. The belt-shifting lever $g^5$ being at one extreme of its movement, the belt H', for instance, will be on the fixed pulley 3 and will turn the shaft $g^2$ in one direction. This movement will be communicated to the shaft $c^5$ and vertical screw-shaft D, which screw-shaft will simultaneously raise the plate $e^2$ and turn the gear $e^5$. The spray-pipe F will thus be raised and simultaneously revolved, and the spray during this upward movement will cover the entire wall B from the bottom $b^4$ to the top $b'$. As the spray reaches the top the arm $e^7$ will engage spring $i^3$ and through collar $i^2$ raise the rod I and move the belt-shifting lever into the position shown in Fig. 4, thus reversing the movement of the shafts and screw and cause the spray-pipe to rotate in the opposite direction and simultaneously descend. When it reaches the lower end of its travel, arm $e^7$ will engage the spring $i^4$ and again shift the belts and reverse the movement of the parts. In this manner the spray-pipe will move up and down and rotate, so as to spread the water over the entire surface upon which it is desired to form ice.

It will be evident that the operation so far as described would spread the water evenly over a cylindrical surface or one which was substantially cylindrical. In the present instance I have shown a four-sided wall B, rectangular in cross-section. It will be evident that if the screw-shaft D revolved at a uniform speed more ice would be formed in the middle of each wall than in the corners. To obviate this difficulty, shaft $g^2$ is set out of line with the shaft $c^5$, as illustrated in Fig. 6, and the latter shaft will therefore obviously rotate more rapidly at one part of its revolution than at another. The gear $d^2$ has twice as many teeth as the gear $c^6$, and the screw-shaft D will therefore have two slow and two rapid movements during each rotation. Likewise the gear $e^5$ has one-half as many teeth as the gear $e^6$, and the gear $e^6$ will therefore have four slow and four rapid movements during each revolution. By adjusting the pipe F so that the spray is moved more slowly while passing the corners than while passing the middle parts of the sides of the wall B, I am thus enabled to so distribute the water that ice of substantially uniform thickness will be formed on the entire wall. When ice of the desired thickness is formed, the machine is stopped, with the spray-pipe at its highest point and the valve M² closed. The spray-pipe is then raised additionally by any suitable means or by hand to clear the top of the vessel A, and the cover $a^2$ and the mechanism carried thereby are raised by the crane and swung out to one side. The ice may then be removed by any suitable apparatus.

Having described my invention, what I claim, and desire to secure by Letters Patent, is—

1. The combination with a freezing-chamber, and means for maintaining a vacuum therein, of a movable spraying device for introducing water to be frozen into said chamber, and means for moving said spraying device while introducing said water to distribute the water over the surface upon which the ice is to be formed.

2. The combination with a freezing-chamber, and means for maintaining a vacuum therein, of a movable spraying device for introducing water to be frozen into said chamber, and means for reciprocating said spraying device while introducing said water.

3. The combination with a freezing-chamber, and means for maintaining a vacuum therein, of a movable spraying device for introducing water to be frozen into said chamber, and means for moving said spraying device in two directions simultaneously while introducing said water.

4. The combination with a freezing-chamber, and means for maintaining a vacuum therein, of a movable spraying device for introducing water to be frozen into said chamber, and means for simultaneously reciprocating and rotating said spraying device while introducing said water.

5. The combination with a freezing-chamber, and means for maintaining a vacuum therein, of a movable spraying device for introducing water to be frozen into said chamber, means for reciprocating said spraying device, and means for simultaneously rotating the same at varying speeds, for the purpose set forth.

6. The combination with a freezing-chamber, means for maintaining a vacuum therein, and a self-draining surface within said chamber, of a movable spraying device for introducing water to be frozen into said chamber, and means for moving said spraying device while introducing said water to distribute the water evenly over said surface.

7. The combination with a freezing-chamber, means for maintaining a vacuum therein, and a substantially vertical surface in said chamber upon which ice is formed, of a movable spray-pipe arranged to spray water upon said surface, and means for moving said pipe vertically to distribute said water evenly over said surface.

8. The combination with a freezing-chamber, and means for maintaining a vacuum therein, of a movable spraying device for introducing water to be frozen into said chamber, means for moving said spraying device while introducing said water to distribute the water over the surface upon which ice is to be formed, and means for regulating the flow of water.

9. The combination with the freezing-chamber, means for maintaining a vacuum therein, and a self-draining surface within said chamber upon which ice is formed, of a movable spraying device for introducing water to be frozen into said chamber, means for moving said spraying device relatively to said surface to distribute the water evenly thereon, and means for regulating the flow of water to said spraying device.

10. In vacuum refrigerating apparatus, the combination with a freezing-chamber, and means for maintaining a vacuum therein, of a removable wall within said chamber upon which the ice is formed, and means for spraying water upon said wall.

11. In refrigerating apparatus, the combination of a freezing-chamber having a removable cover, and means for maintaining a vacuum therein, of a removable inner wall extending around said chamber and upon which the ice is formed, and means for spraying water upon said wall.

12. In refrigerating apparatus, the combination with the freezing-chamber, and means for maintaining a vacuum therein, of an inner removable polygonal wall extending continuously around said chamber and upon which the ice is formed, and means for spraying water upon said wall.

13. In refrigerating apparatus, the combination with a freezing-chamber, and means for maintaining a vacuum therein, of an inner removable wall extending continuously around said chamber and upon which the ice is formed, said wall being separable and detachable from the ice to expose the latter for cutting, and means for spraying water upon said wall.

14. In refrigerating apparatus, the combination of the freezing-chamber, a removable cover therefor, a vapor-outlet therefrom, a removable inner wall upon which ice is formed, means for spraying water on said wall, and baffle-plates supported on said wall and on the removable cover.

15. In refrigerating apparatus, the combination of a freezing-chamber, a cover therefor, a movable spray-pipe passing through said cover, mechanism for rotating and reciprocating the spray-pipe, a crane arranged to rock upon a vertical axis, and means for sustaining said cover and mechanism from the arm of the crane.

16. In a refrigerating apparatus, the combination of a freezing-chamber, a vertically-arranged inner wall upon which the ice is formed, a spray-pipe concentric with said wall, and means for rotating and reciprocating said spray-pipe simultaneously whereby ice of substantially even thickness may be formed on said wall.

17. In an apparatus for freezing liquids in a vacuum, a receptacle having vertical sides, and means for maintaining a vacuum therein, in combination with a spray-pipe for supplying the liquid to be frozen, located within the receptacle, and means for imparting to said spray-pipe a reciprocating and revolving motion while delivering its spray.

18. In an apparatus for freezing liquids in a vacuum, a square receptacle having vertical sides, and means for maintaining a vacuum therein, in combination with a movable spray-pipe for supplying the liquid to be frozen, and means for imparting a variable revolving movement to said pipe.

19. In an apparatus for freezing liquids in a vacuum, a receptacle having vertical sides, and means for maintaining a vacuum therein, in combination with a spray-pipe for supplying the liquid to be frozen located within the receptacle, means for revolving said spray-pipe, and means for automatically reciprocating the same therein.

20. In an apparatus for freezing liquids, an upright receptacle, having approximately vertical walls and provided with means for forming and maintaining a vacuum therein, in combination with means for injecting a spray of liquid on the vertical walls to be frozen thereon, and a compartment for receiving the snow, and other detached matter from the freezing liquid.

Signed at Baltimore, in the State of Maryland, this 20th day of July, A. D. 1896.

JOHN PATTEN.

Witnesses:
FELIX R. SULLIVAN,
G. DAVIS NEAVITT.